United States Patent
Erze (10) Patent No.: US 12,051,147 B1
(45) Date of Patent: Jul. 30, 2024

(54) TECHNIQUES FOR POINT CLOUD REPRESENTATION

(71) Applicant: Apple Inc., Cupertino, CA (US)

(72) Inventor: Tyson Erze, Mt. Hermon, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 17/736,339

(22) Filed: May 4, 2022

Related U.S. Application Data (60) Provisional application No. 63/189,997, filed on May 18, 2021.

(51) Int. Cl.
- *G06T 17/20* (2006.01)
- *G06T 7/80* (2017.01)
- *G06T 15/20* (2011.01)
- *G06T 17/00* (2006.01)
- *G06V 20/64* (2022.01)

(52) U.S. Cl.
CPC ............. *G06T 15/20* (2013.01); *G06T 17/00* (2013.01); *G06V 20/64* (2022.01); *G06T 2200/24* (2013.01); *G06T 2210/56* (2013.01); *G06V 2201/09* (2022.01)

(58) Field of Classification Search
CPC ..... G06T 15/20; G06T 17/00; G06T 2200/24; G06V 20/64
USPC .......................................................... 345/419
See application file for complete search history.

(56) References Cited

U.S. PATENT DOCUMENTS

| | | | |
|---|---|---|---|
| 7,305,121 B2 | 12/2007 | Kaufmann et al. | |
| 9,088,787 B1 | 7/2015 | Smith et al. | |
| 9,159,166 B2 | 10/2015 | Finn et al. | |
| 9,701,015 B2 | 7/2017 | Buehler et al. | |
| 10,255,381 B2 | 4/2019 | Walle et al. | |
| 10,373,380 B2 | 8/2019 | Kutliroff et al. | |
| 10,909,758 B2 | 2/2021 | Bell et al. | |
| 11,348,269 B1 | 5/2022 | Ebrahimi Afrouzi et al. | |
| 11,430,206 B1 | 8/2022 | Papazov et al. | |
| 11,562,560 B1 | 1/2023 | Ruepp et al. | |
| 11,586,843 B1 | 2/2023 | Pertsel | |
| 11,589,183 B2 | 2/2023 | Tu et al. | |
| 11,875,527 B1 | 1/2024 | Paz-Perez et al. | |
| 2013/0181983 A1* | 7/2013 | Kitamura | G06T 17/00 345/419 |
| 2015/0206023 A1* | 7/2015 | Kochi | G06T 17/10 382/199 |
| 2018/0364033 A1* | 12/2018 | Döring | G01B 11/245 |
| 2019/0033064 A1* | 1/2019 | Becker | H04N 13/25 |
| 2019/0279024 A1* | 9/2019 | Martinello | G06F 16/7335 |

(Continued)

FOREIGN PATENT DOCUMENTS

| CN | 112241998 A | 1/2021 |
|---|---|---|
| WO | 2015192117 A1 | 12/2015 |

(Continued)

OTHER PUBLICATIONS

Shutz, Markus; Krosi, Katharina; Wimmer, Michael; "Real-Time Continuous Level of Detail Rendering of Point Clouds"; Conference Paper; Mar. 2019; pp. 1-9.

(Continued)

*Primary Examiner* — Javid A Amini (74) *Attorney, Agent, or Firm* — Thompson Hine LLP (57) ABSTRACT

Various implementations disclosed herein provide views of point clouds with individual points rendered using different visual graphics.

20 Claims, 7 Drawing Sheets

(56) References Cited

U.S. PATENT DOCUMENTS

| | | | |
|---|---|---|---|
| 2019/0287297 A1* | 9/2019 | Abhiram | G06N 20/00 |
| 2020/0098141 A1 | 3/2020 | Mikkola et al. | |
| 2020/0154137 A1 | 5/2020 | Fleureau et al. | |
| 2020/0341466 A1 | 10/2020 | Pham et al. | |
| 2021/0056763 A1 | 2/2021 | Molyneaux et al. | |
| 2021/0279957 A1* | 9/2021 | Eder | G06Q 40/08 |
| 2022/0066456 A1 | 3/2022 | Ebrahimi Afrouzi et al. | |

FOREIGN PATENT DOCUMENTS

| | | |
|---|---|---|
| WO | 2023038808 A1 | 3/2023 |
| WO | 2023038820 A1 | 3/2023 |

OTHER PUBLICATIONS

"Point Cloud Rendering"; pp. 1-6; Copyright © 2019-2020 LG Electronics Inc.

Kim, H-U. et al., "Hybrid Representation and Rendering of Indoor Environments Using Meshes and Point Clouds," The 11th International Conference of Ubiquitous Robots and Ambient Intelligence (URAI 2014), Kuala Lumpur, Malaysia, 3 pages, 2014.

Desurmont, X. et al., "Real-Time 3D Video Conference on Generic Hardware," Proceedings of SPIE—The International Society for Optical Engineering, 12 pages, 2007.

Kaiser, A. et al., "Geometric Proxies for Live RGB-D Stream Enhancement and Consolidation," arxiv.org, Cornell University Library, Ithaca, New York, 20 pages, 2020.

* cited by examiner

TECHNIQUES FOR POINT CLOUD REPRESENTATION

CROSS-REFERENCE TO RELATED APPLICATIONS

This application claims the benefit of U.S. Provisional Application Ser. No. 63/189,997 filed May 18, 2021, which is incorporated herein in its entirety.

TECHNICAL FIELD

The present disclosure generally relates to techniques for efficiently providing views of content via electronic devices.

BACKGROUND

A point cloud is a set of points representing content, e.g., one or more 3D objects, in a 3D space. Each point of a point cloud may be associated with coordinates that define its position relative to the other points in the 3D space. Point clouds may represent physical objects and may be produced, for example, using sensors (e.g., image sensors, depth sensors, etc.) and software that generates the point clouds based on data from the sensors. Point clouds may represent virtual objects and be produced, for example, via software that generates point clouds based on 3D models and/or user input. Existing techniques for depicting content represented by point clouds can be data-intensive and may not convey information about the source of the point clouds and/or other relevant information about the point clouds.

SUMMARY

Various implementations disclosed herein provide views of point clouds with individual points rendered using different graphics or other display characteristics (e.g., dots, shapes, logos, etc.). Points clouds points may be rendered based on distance from the viewpoint. For example, far away points of a point cloud may be rendered as dots while close-up points may be rendered using more complex features such as textures, images, logos, and/or animations. Transitions in the graphics used for the points of point cloud may also be provided. For example, blended features or animations may be used for points at an intermediate distance or to show points changing as the viewpoint changes. In some implementations, a point's appearance is used to convey information such as branding associated with the products/processes used to produce the 3D model of the represented object(s). In some implementations, a point's appearance is used to convey information such as user interface capabilities associated with a 3D model represented by the points.

Some implementations provide a non-transitory computer-readable storage medium storing program instructions executable by one or more processors to perform operations of a method. The operations include obtaining point cloud data specifying relative positions of a plurality of points of a point cloud representing a shape of one or more objects. For example, the point cloud data may be a 3D model that was created by a branded device and/or process. In some implementations, the point cloud data includes metadata indicating that the point cloud is to be displayed (e.g., in certain circumstances) using display characteristics indicative of a branded device and/or process.

The operations of the exemplary method determine positions for the plurality of points in a coordinate system corresponding to an environment. For example, this may involve determining that a virtual vase represented by the point cloud will be positioned to appear on a real or virtual surface in an extended reality (XR) environment.

The operations of the exemplary method determine a viewpoint within the coordinate system. Such a viewpoint may be determined based on the position and orientation of an electronic device. For example, as the user moves the electronic device, the viewpoint may be moved closer or further away from points of the point cloud.

The operations of the exemplary method determine display characteristics for the plurality of points based on spatial relationships (e.g., distances) between the positions determined for the plurality of points and the viewpoint in the coordinate system. For example, relatively closer points may be depicted as branded logos and relatively farther points may be represented as dots. The spatial relationship may be whether an individual point exceeds a distance threshold, whether any point of a represented object exceeds a distance threshold, whether a point is amongst a threshold number of closest points, whether any point of a represented object is amongst the threshold number of closest points, etc. Additional or alternative evaluations may also be used to determine the display characteristics of the points of the point cloud.

The operations of the exemplary method further include generating (e.g., for display on an electronic device) a view based on the viewpoint. The view may include a point cloud that includes depictions of the plurality of points according to the determined display characteristics. In some implementations, the view includes a physical environment that may be displayed or viewed through a see-through device. In some implementations, the point cloud is displayed within a virtual environment that is also displayed based on the viewpoint.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
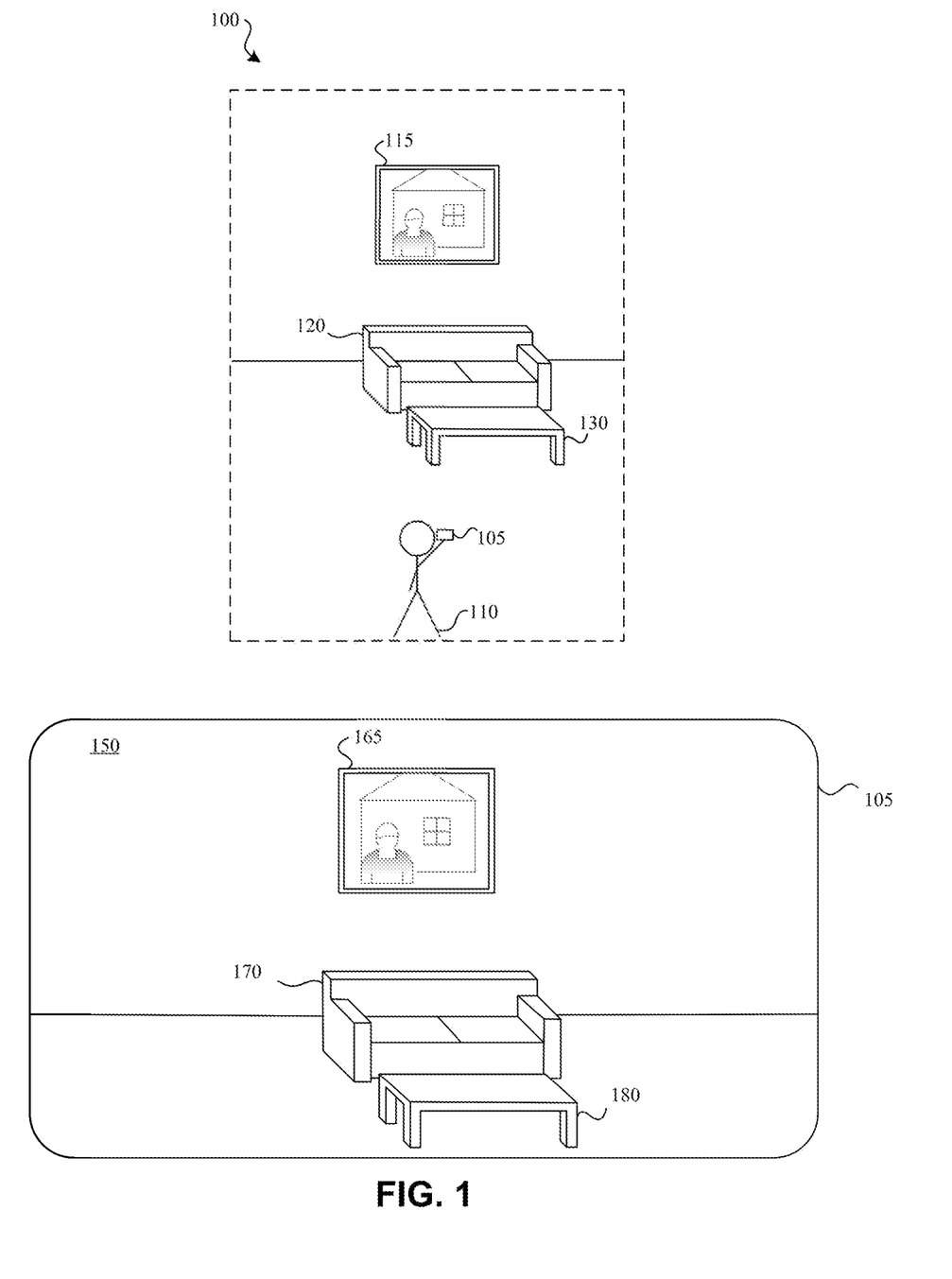
FIG. 1 illustrates an exemplary operating environment in accordance with some implementations.

FIG. 1 illustrates an exemplary physical environment 100 in which device 105 is used by user 110. The physical environment 100 includes a wall-hung painting 115, a couch 120, and a table 130. Device 105 includes one or more cameras and/or other sensors that can be used to provide views of the physical environment. For example, device 105 may provide a view (based on its current viewpoint position with physical environment 100) that includes depiction 165 of wall-hung painting 115, depiction 170 of couch 120, and depiction 180 of table 130. In some implementations, device 105 provides an optical see-through view of the physical environment 105.

In the example of FIG. 1, the device 105 is illustrated as a single device. Some implementations of device 105 is hand-held. For example, device 105 is a mobile phone, a tablet, a laptop, so forth. In some implementations, device 105 is worn by a user. For example, device 105 is a watch, a head-mounted device (HMD), head-worn device (glasses), so forth. In some implementations, functions of the device 105 are accomplished via two or more devices, for example additionally including a base station. Other examples include a laptop, desktop, server, or other such device that includes additional capabilities in terms of power, CPU capabilities, GPU capabilities, storage capabilities, memory capabilities, and the like. The multiple devices that may be used to accomplish the functions of device 105 may communicate with one another via wired or wireless communications.

Figure 4:
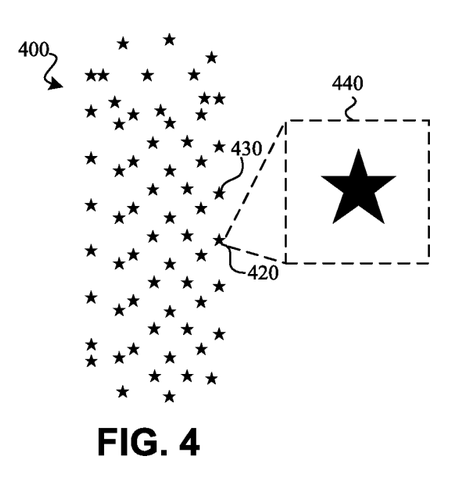
FIG. 4 illustrates the point cloud of FIG. 2 with points exhibiting a second display characteristic in accordance with some implementations.
Figure 5:
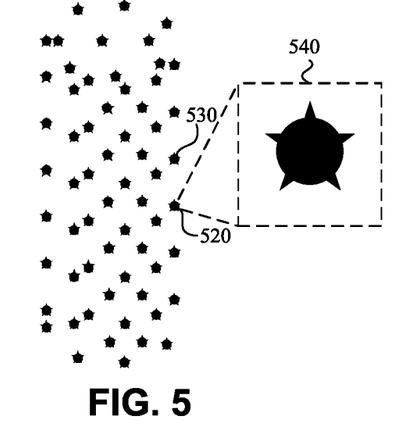
FIG. 5 illustrates the point cloud of FIG. 2 with points exhibiting a blended appearance based on the first and second display characteristics in accordance with some implementations.
Figure 6:
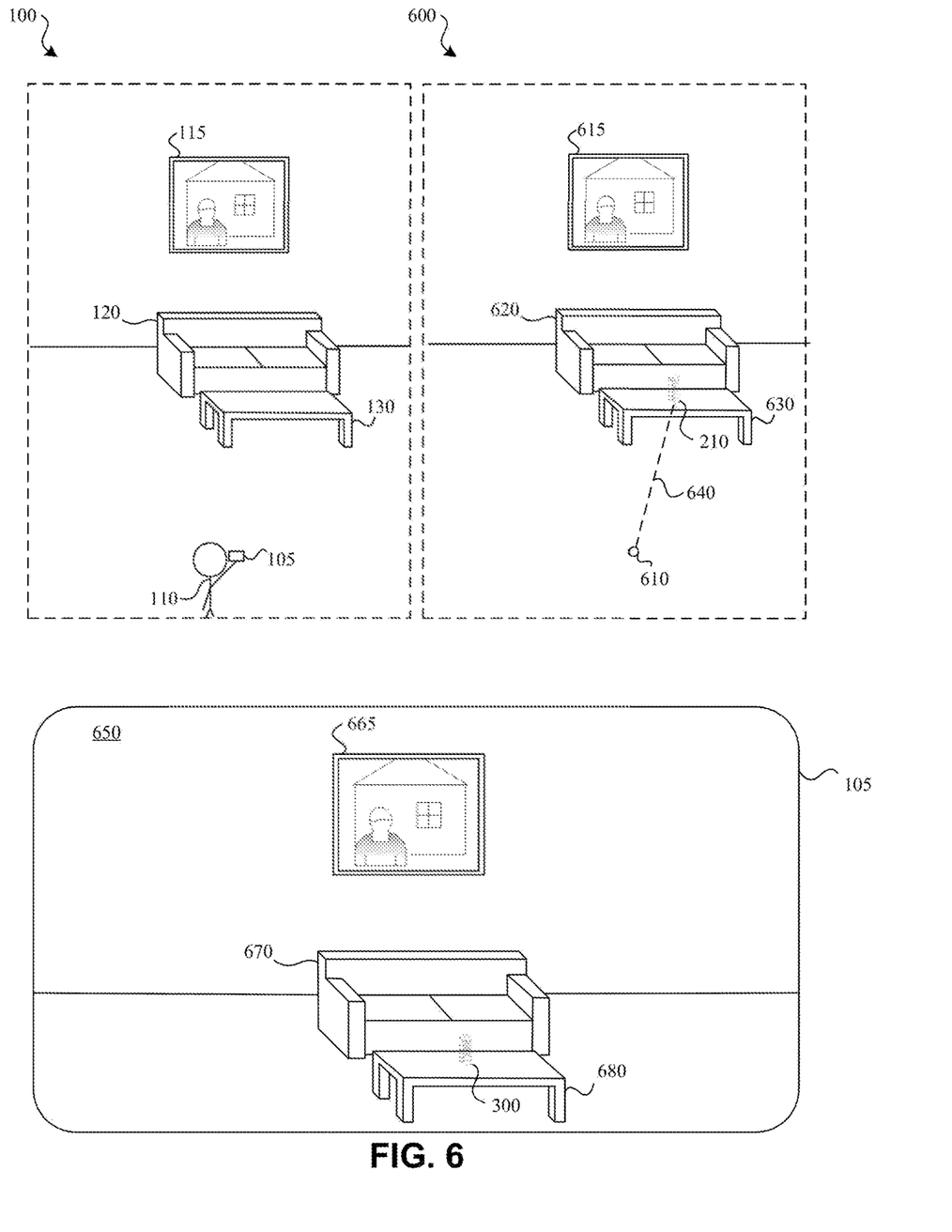
FIG. 6 illustrates a view of an environment including the point cloud of FIG. 2 with points exhibiting the first display characteristic based on the spatial relationship of the viewpoint in accordance with some implementations.
Figure 7:
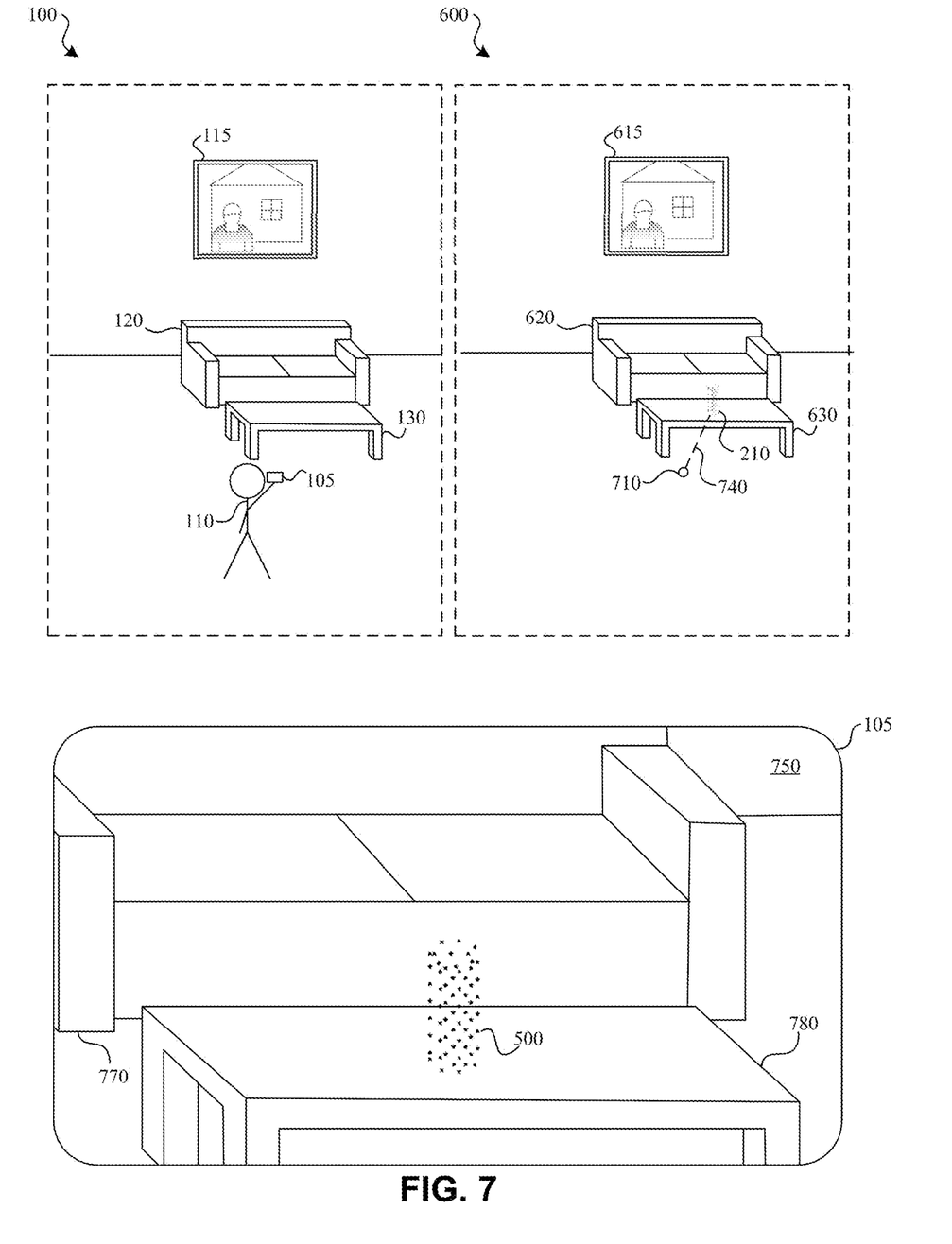
FIG. 7 illustrates a view of an environment including the point cloud of FIG. 2 with points exhibiting the blended appearance based on the spatial relationship of the viewpoint in accordance with some implementations.
Figure 8:
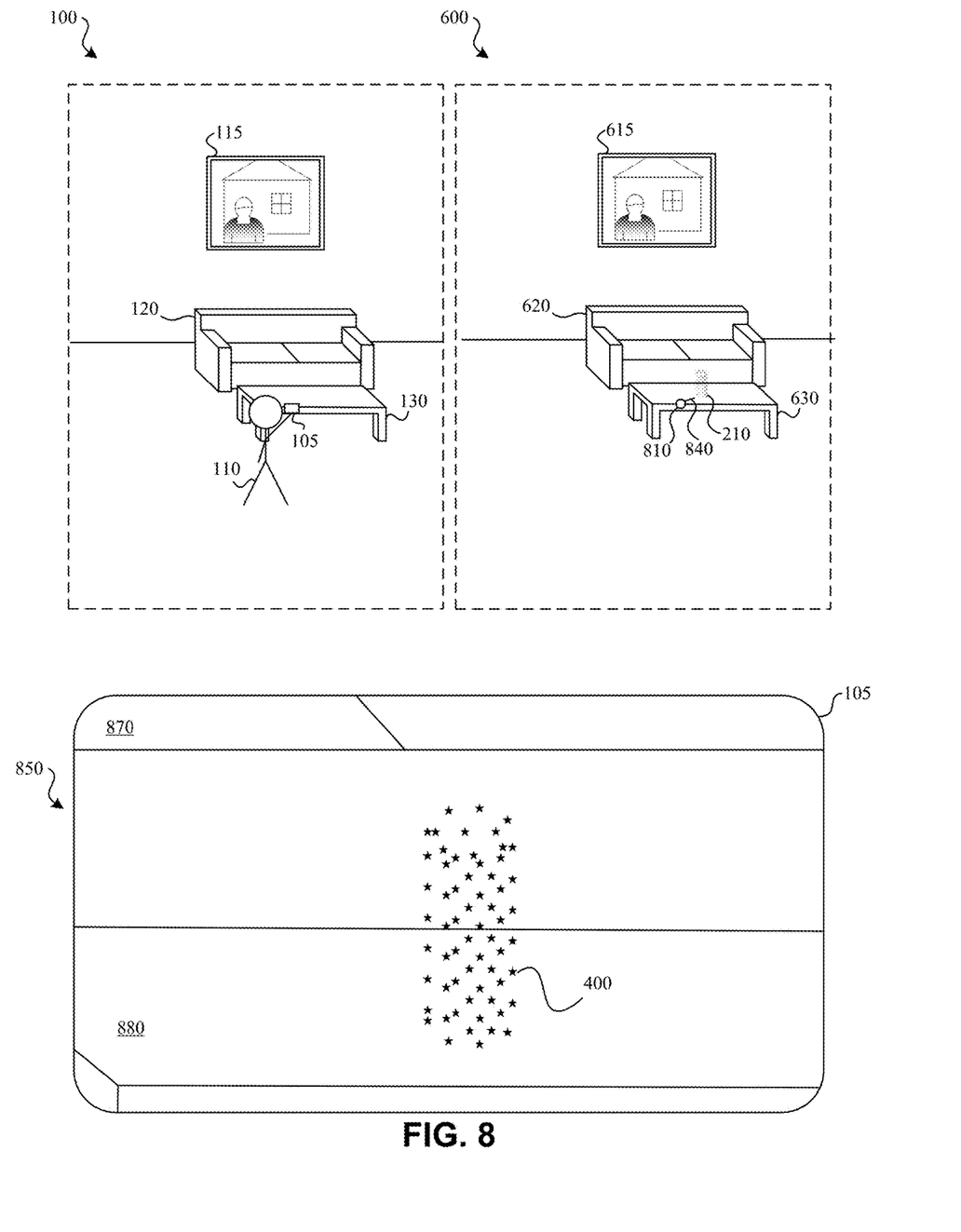
FIG. 8 illustrates a view of an environment including the point cloud of FIG. 2 with points exhibiting the second display characteristic based on the spatial relationship of the viewpoint in accordance with some implementations.

Various implementations disclosed herein render a point cloud representing one or more objects within a view of an environment. For example, a point cloud may be rendered to appear at a position (e.g., on the depiction 180 of table 130) in FIG. 1. As illustrated in FIGS. 2-8, the display characteristics of the points of the point cloud depend upon one or more determinations. FIGS. 2-5 illustrate point cloud points having alternative display characteristics. FIGS. 6-8 illustrate use of such point clouds within an environment in which the point cloud points are rendered differently depending upon different viewpoints and/or circumstances.

Figure 2:
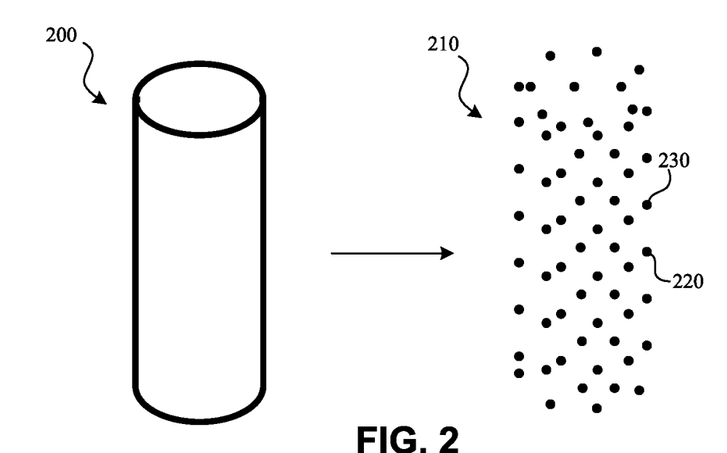
FIG. 2 illustrates an exemplary point cloud representation of an object in accordance with some implementations.

FIG. 2 illustrates an exemplary point cloud 210 representation of an object 200. A point cloud is a set of points defined with respect to a coordinate space, e.g., a 3 dimensional (3D) coordinate system. Each point may have a coordinate position within that space. For example, each of exemplary points 220, 230 may have a coordinate position within a 3D coordinate system. Point cloud points generally (although not necessarily) correspond to surface positions on the surfaces of one or more objects that the points represent. Point clouds may, but do not necessarily, also provide information about the appearance of the one or more object they represent. For example, points of a point cloud may have associated color, texture, normal direction, or other values associated with the appearance of the respective objects at the corresponding positions. Point clouds of real objects may be produced based on sensor data, e.g., 3D scanners, RGB cameras, depth sensors, etc. Point clouds may also be synthetically generated and/or modified for example via software and/or machine learning models.

Figure 3:
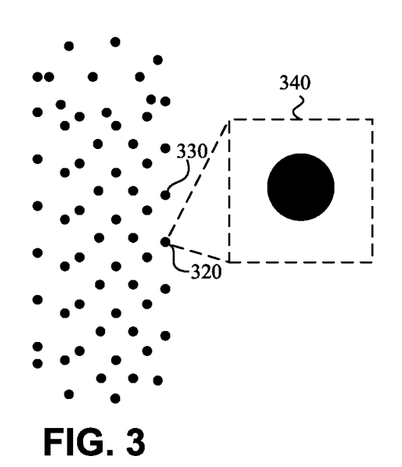
FIG. 3 illustrates the point cloud of FIG. 2 with points exhibiting a first display characteristic in accordance with some implementations.

FIG. 3 illustrates the point cloud 210 of FIG. 2 with points exhibiting a first display characteristic. In this example, the points of the point cloud 210 are represented using dots. For example, point representations 320, 330 (of points 220, 230, respectively) have a circular shape. Close-up 340 provides a larger view of point representation 320 for illustrative purposes. In contrast, FIG. 4 illustrates the point cloud of FIG. 2 with points exhibiting a second display characteristic. In this example, the points of the point cloud 210 are represented using stars. For example, point representations 420, 430 (of points 220, 230, respectively) have five-pointed star shapes. Close-up 440 provides a larger view of point representation 420 for illustrative purposes. FIG. 5 illustrates the point cloud of FIG. 2 with points exhibiting a blended appearance based on the first and second display characteristics. In this example, the points of the point cloud 210 are represented with an appearance derived by blending the dot and star shapes of FIGS. 3-4. For example, point representations 520, 530 (of points 220, 230, respectively) have blended appearances. Close-up 540 provides a larger view of point representation 520 for illustrative purposes.

FIG. 6 illustrates a view 650 of an environment 600 including the point cloud of FIG. 2 with points exhibiting the first display characteristic based on the spatial relationship of a viewpoint. In this example, device 105 generates an environment 600 based on physical environment 100 and the point cloud 210 (of FIG. 2). This may involve generating depth and 3D information about the physical environment 210 to enable positioning of point clouds at 3D locations relative to objects of the physical environment 100. For example, a 3D reconstruction of the physical environment 100 may be generated that includes representations of the objects of the physical environment 100 and a point cloud may be positioned at a position on or near one of the representations in the 3D reconstruction environment. In this example, the environment 600 includes a representation 615 of the wall-hung painting 115, a representation 620 of the couch 120, and a representation 630 of the table 130. The point cloud 210 is positioned within the environment 600. In this example, the point cloud 210 is positioned on top of a top surface of the representation 630 of the table 130.

Device 105 provides a view 650 of the environment 600 from viewpoint 610. The view 650 includes a depiction 665 of the wall-hung painting 115, a depiction 670 of the couch 120, and a depiction 680 of the table 130. In the view 650, the point cloud 210 is rendered based on display characteristics determined for the points of the point cloud 210. Specifically, one or more spatial relationships between the points of the point cloud 210 and the viewpoint 610 are used to determine the display characteristics for the points of the point cloud 210. In this example, since the distance (e.g., distance 640) between the viewpoint 610 and each point of the point cloud 210 is greater than a threshold distance, each of these points has a first display characteristic, e.g., each point is displayed as a dot. Accordingly, the view 650 includes depiction 300 of FIG. 3. In some implementations, the display characteristic of each point is assessed individually, e.g., based on the respective point's distance from the viewpoint 610. In some implementations, the display characteristics of a given object are determined together, e.g., based on the closest point's distance from the viewpoint 610.

In the example of FIG. 6, the viewpoint 610 is based on the position of the device 105 in the physical environment 100. Thus, as the device 105 is moved within the physical environment 100, the viewpoint's position in the environment 600 changes accordingly. For example, as illustrated in FIG. 7, based on the device 105 having moved in the physical environment 100, a new viewpoint 700 position is provided.

FIG. 7 illustrates a view 750 of the environment 600 including the point cloud of FIG. 2 with points exhibiting the blended appearance based on the spatial relationship of the viewpoint. Device 105 provides a view 750 of the environment 600 from viewpoint 710. The view 750 includes a depiction 770 of the couch 120 and a depiction 780 of the table 130. In the view 750, the point cloud 210 is rendered based on display characteristics determined for the points of the point cloud 210. Specifically, one or more spatial relationships between the points of the point cloud 210 and the viewpoint 710 are used to determine the display characteristics for the points of the point cloud 210. In this example, since the distance (e.g., distance 740) between the viewpoint 710 and each point of the point cloud 210 is within an intermediate distance range, each of these points has a blended appearance, e.g., each point is displayed as a blend of a dot and a star. Accordingly, the view 750 includes depiction 500 of FIG. 5.

FIG. 8 illustrates a view 850 of an environment including the point cloud of FIG. 2 with points exhibiting the second display characteristic based on the spatial relationship of the viewpoint. Device 105 provides a view 850 of the environment 600 from viewpoint 810. The view 850 includes a depiction 870 of the couch 120 and a depiction 880 of the table 130. In the view 850, the point cloud 210 is rendered based on display characteristics determined for the points of the point cloud 210. Specifically, one or more spatial relationships between the points of the point cloud 210 and the viewpoint 810 are used to determine the display characteristics for the points of the point cloud 210. In this example, since the distance (e.g., distance 840) between the viewpoint 810 and each point of the point cloud 210 is less than a threshold, each of these points has a second display characteristic, e.g., each point is displayed as a star. Accordingly, the view 850 includes depiction 400 of FIG. 4.

Figure 9:
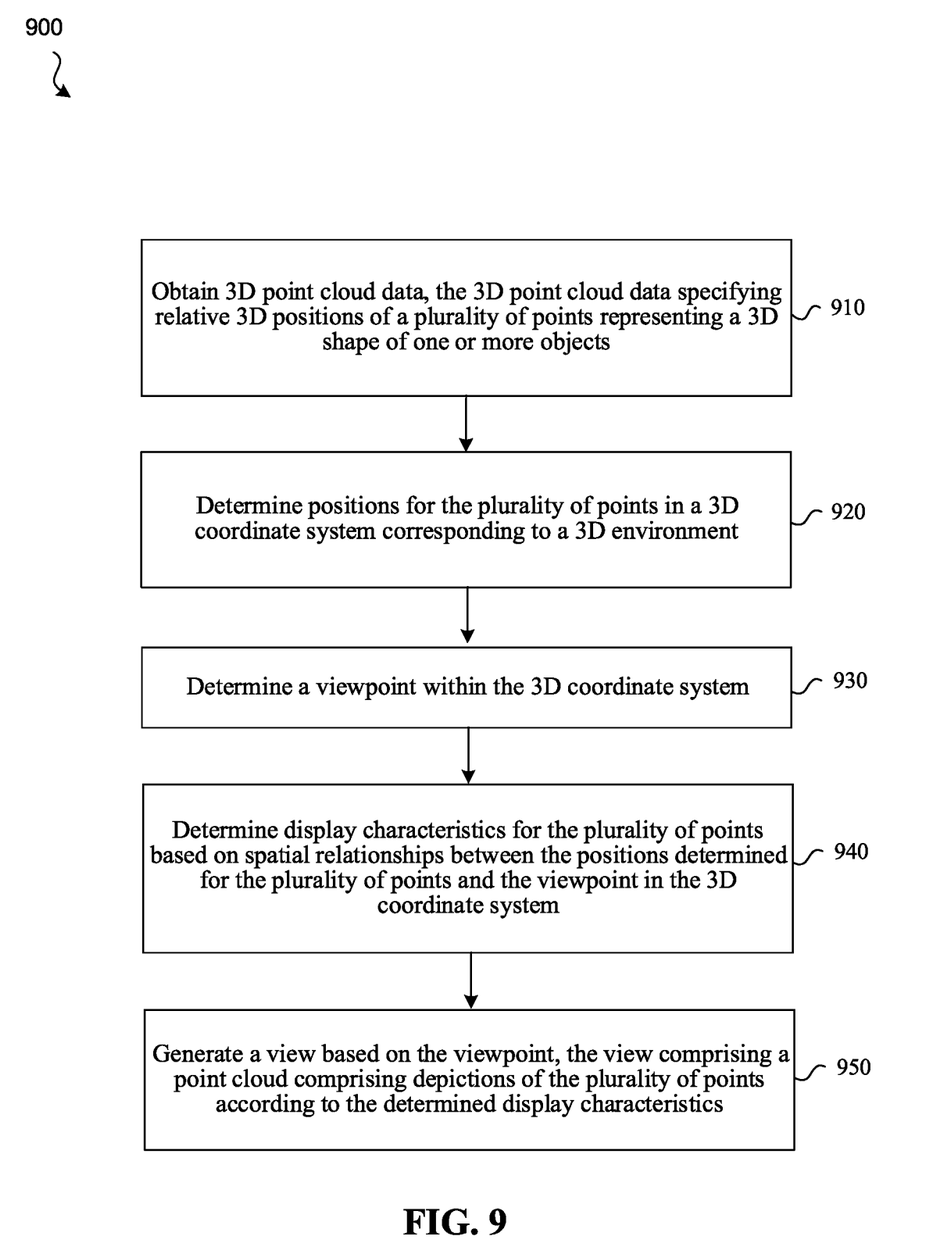
FIG. 9 is a flowchart illustrating generating a view of a point cloud with depictions of points having display characteristics based on the spatial relationship of the viewpoint in accordance with some implementations.

FIG. 9 is a flowchart illustrating an exemplary method 900. In some implementations, a device such as device 1000 (FIG. 10) performs the techniques of method 900 to provide a view of a point cloud with depictions of points having display characteristics based on one or more spatial relationships of points with respect to a viewpoint. In some implementations, the techniques of method 900 are performed on a mobile device, desktop, laptop, HMD, or server device. In some implementations, the method 900 is performed on processing logic, including hardware, firmware, software, or a combination thereof. In some implementations, the method 900 is performed on a processor executing code stored in a non-transitory computer-readable medium (e.g., a memory).

At block 910, the method 900 obtains point cloud data specifying relative positions of a plurality of points representing a shape of one or more objects. For example, the point cloud data may be a 3D model that was created by a branded device and/or process. The point cloud data may include metadata indicating the source (e.g., branded device/process used for creation) of the point cloud and/or that the point cloud is to be displayed using particular display characteristics in particular circumstances. The point cloud data may include or define shapes, logos, sizes, colors, or other attributes that provide display characteristics for displaying point cloud points in different circumstances. The point cloud data may include source data (e.g., what branded device or process used to generate the point cloud) from which display characteristics for different circumstances may be determined. For example, a point cloud may include metadata signaling that the point cloud was generated via a brand X 3D modeling device and/or software, where the metadata signals that a particular point rendering process should be used in rendering the point cloud.

At block 920, the method 900 determines positions for the plurality of points in a coordinate system corresponding to an environment. For example, this may involve determining that the point cloud will be depicted on or adjacent to a real of virtual object, e.g., on top of a table, on the floor a set distance from a couch, etc.

In some implementations, a point cloud is positioned spatially with reference to a physical environment. Characteristics of the physical environment may be determined based on sensor data from one or more sensors. The sensor data (e.g., light intensity data and depth data) may include data for multiple points in time, e.g., for a sequence of image frames. The sensor data may include light-intensity images (e.g., greyscale images, RGB images, etc.) from one or more cameras, depth sensor images from one or more depth sensors, ambient light data from one or more ambient light sensors, motion data from accelerometers, gyroscopes, etc., and/or other types of data from other types of sensors. The sensor data (e.g., light intensity data, depth data, ambient light data, motion data, etc.) may be integrated (e.g., fused) using one or more known techniques. The spatial characteristics of a physical environment may be determined via the sensor data. In some implementations, a 3D reconstruction of a physical environment is generated, and the point cloud is positioned relative to one or more representations within the 3D reconstruction. In some implementations, the point cloud is positioned within an entirely virtual environment, for example, at a position relative to a virtual object within the virtual environment.

At block, 930 the method 900 determines a viewpoint within the coordinate system of the environment. In some implementations, the view is to be provided depicting at least a portion of the physical environment, and the viewpoint is a position within the physical environment from which the view is to be provided. The method 900 may determine the viewpoint by determining a position and orientation of an electronic device within a physical environment. In this example, the determined viewpoint represents the position from which the device is currently viewing the physical environment.

In some implementations, the view depicts at least a portion of a 3D reconstruction, and the viewpoint is a position within the 3D reconstruction. The position of the viewpoint within the 3D reconstruction may correspond to the current position of the device within the corresponding physical environment.

In some implementations, the view depicts an entirely virtual environment and the viewpoint is a position within the virtual environment.

Regardless of environment type, the viewpoint may be provided based on user input and/or movement of an electronic device. In some implementations, the viewpoint changes according to movement of the device, e.g., as the user moves the device, the viewpoint may be moved closer or further away from points of the point cloud and associated portions of the environment. In some implementations, the viewpoint changes according to user input, e.g., pinching to zoom by moving the viewpoint closer.

At block 940, the method 900 determines display characteristics for the plurality of points based on spatial relationships between the positions determined for the plurality of points and the viewpoint in the coordinate system. In some implementations, the complexity (e.g., in terms of details, number of colors, rendering resource requirements, etc.) of the display characteristic increases based on the proximity of the viewpoint to the points, e.g., complexity may increase as viewpoint gets closer to the points. In one example, relatively closer points are depicted as branded logos and relatively farther points are represented as dots.

In some implementations, the display characteristics of the point clouds points are based on a relative position of points of the point cloud and the viewpoint. The display characteristics may be based on distance between respective points of the plurality of points and the viewpoint in the coordinate system. In some implementations, points within a threshold distance (e.g., 1 foot, 2 feet, 3 feet, 4 feet, etc.) of the viewpoint are represented using a first display characteristic and points beyond the threshold distance to the viewpoint are represented using a second display characteristic different than the first display characteristic.

In some implementations, points are treated in groups, e.g., groups of points may be associated with each object represented by a point cloud. For example, all points representing a given object such as a cup may be treated the same. In such instances, the spatial relationship of a single point of the group may be assessed to determine the display characteristic used for all of the points of the group. In one example, all points (of an object or of an entire point cloud) may be represented using a first characteristic if any point of the group is within the threshold distance.

In some implementations, different display characteristics are determined for points of a single point cloud, e.g., representing a relatively large object or set of objects. In some implementations, a fixed number of points closest to the viewpoint are represented using a first display characteristic and other points are represented using a second display characteristic different than the first display characteristic. Such different treatment may provide improved efficiency, for example, in circumstances in which a relatively large point cloud includes many points.

In some implementations, display characteristics are selected based on additional or different evaluations. For example, gaze direction may be used to determine point cloud point display characteristics. Display characteristics, for example, may be determined based on determining whether a user is or is not gazing in the direction of the point cloud. Only points proximate the direction of the user's current gaze may be rendered using display characteristics that are computationally or resource intensive. As another example, display characteristics may depend upon the speed at which the viewpoint position or angle is changing. Simpler display characteristics may be used, for example, when the viewpoint is rapidly changing.

At block 940, the method 900 generates a view based on the viewpoint, the view comprising a point cloud comprising depictions of the plurality of points according to the determined display characteristics. The view may include depictions of the environment (e.g., the physical environment, the virtual environment, etc.). The display characteristics may determine whether a given point or set of points of the point cloud has one of a number of shapes, colors, color combinations, sizes, animations, or other attributes.

The view may be generated as part of a rendering process that determines whether to render the point cloud using circumstance-dependent display characteristics. For example, the rendering process may recognize an identifier or other information in the point cloud data that identifies that the rendering process should render the points different depending upon different circumstances, e.g., different viewpoint distances. In some implementations, method 900 obtains, from the point cloud data, a logo associated with a source of the point cloud object and the depictions of the plurality of points comprise the logo. The logo may only be used in some conditions, e.g., for points that satisfy a spatial relationship with respect to the current viewpoint.

Additional factors may be used in determining point cloud point display characteristics. In some implementations, the point cloud is a 3D model associated with a user interface capability and the display characteristics identify the user interface capability. For example, the points may have a particular shape that indicates whether the point cloud is fixed or can be repositioned with the environment. In another example, the points may have a display characteristic that indicates that the point cloud corresponds to an object that is capable of receiving a certain type of input, e.g., voice, touch, gaze-based, etc.

In some implementations, the purpose or use of an object represented by a point cloud is used in determining display characteristics. In some implementations, whether an object represented by a point cloud is being held or touched is used in determining display characteristics. In some implementations, the context of an interaction is used in determining display characteristics.

Some implementations disclosed herein render points of a point cloud based on circumstances such as distance from a viewpoint. One advantage of such a selective rendering approach is to reduce the computation that might otherwise be required to render all points of a point cloud using relatively computationally expensive techniques. Instead, only a subset of points may be rendered or points may only be rendered in certain circumstances, using less of the relatively computationally expensive processes. Views may be provided that provide detailed and informative point cloud point representations in circumstances in which it is important to do so (e.g., when the user is close to those points) without the computation expense of a system that might be required to render using the computationally expensive processes in all circumstances.

However, in some implementations, point cloud points may be rendered using the same display characteristic, e.g., all dots, all logos, all stars, etc. In some implementations, a content creator and/or viewer specifies user preferences that specify how point cloud points are to be rendered. In some implementations, computational characteristics of the device are assessed to automatically select an appropriate point cloud display methodology.

Figure 10:
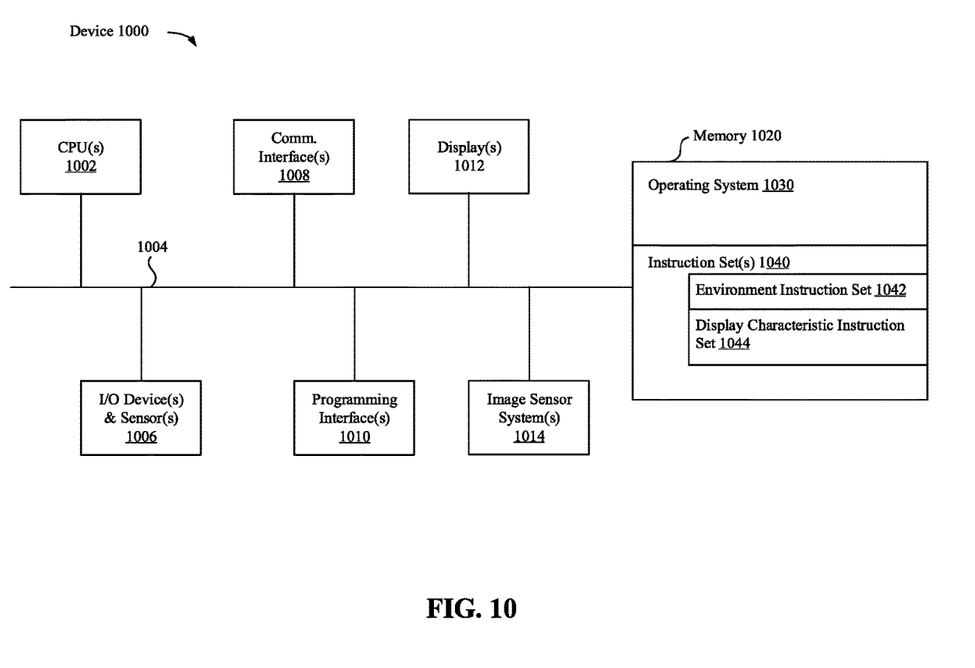
FIG. 10 illustrates an exemplary device in accordance with some implementations.

FIG. 10 is a block diagram of an example device 1000. Device 1000 illustrates an exemplary device configuration for device 105. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1000 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1010, one or more displays 1012, one or more interior and/or exterior facing image sensor systems 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 1012 are configured to present a view of a physical environment or a graphical environment to the user. In some implementations, the one or more displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 1012 correspond to diffractive, reflective, polarized, holographic, etc. waveguide displays. In one example, the device 1000 includes a single display. In another example, the device 1000 includes a display for each eye of the user.

In some implementations, the one or more image sensor systems 1014 are configured to obtain image data that corresponds to at least a portion of the physical environment. For example, the one or more image sensor systems 1014 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1014 further include illumination sources that emit light, such as a flash. In various implementations, the one or more image sensor systems 1014 further include an on-camera image signal processor (ISP) configured to execute a plurality of processing operations on the image data.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium.

In some implementations, the memory 1020 or the non-transitory computer readable storage medium of the memory 1020 stores an optional operating system 1030 and one or more instruction set(s) 1040. The operating system 1030 includes procedures for handling various basic system services and for performing hardware dependent tasks. In some implementations, the instruction set(s) 1040 include executable software defined by binary information stored in the form of electrical charge. In some implementations, the instruction set(s) 1040 are software that is executable by the one or more processing units 1002 to carry out one or more of the techniques described herein.

The instruction set(s) 1040 include an environment instruction set 1042 and a display characteristic instruction set 1042. The instruction set(s) 1040 may be embodied as a single software executable or multiple software executables.

The environment instruction set 1042 is executable by the processing unit(s) 1002 to present a view of an environment such as a physical environment or other graphical environment. In some implementations, the environment instruction set 1042 is executed to define a position of a device relative to the physical environment (e.g., in a coordinate system) or a corresponding graphical environment (e.g., in a coordinate system of a 3D reconstruction environment) and move the position of the device based on real-world movements of the device. In some implementations, the environment instruction set 1042 is executed to track a movement or positioning (e.g., pose) of the device relative to a coordinate system of the physical environment or the graphic environment. The environment instruction set 1042 is executed to determine and/or adjust the view of a physical environment or graphical environment based on such movement or positioning. For example, the environment instruction set 1042 may be executed to provide a view that changes as the device is moved or rotated. As a specific example, as the user turns the device to face left, executed instructions of the environment instruction set 1042 may change the view to show objects that are to the left of the device's position in the physical environment or graphical environment. As another example, as the user moves the device forward, executed instructions of the environment instruction set 1042 may change the view to show the objects from a correspondingly closer perspective based on objects now being relatively closer to the device's position.

The environment instruction set 1042 may provide an extended reality environment. An extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect rotational head movement and, in response, adjust graphical content and an acoustic field presented to the person in a manner similar to how such views and sounds would change in a physical environment. As another example, the XR system may detect rotational or translational movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), adjustments to characteristic(s) of graphical content in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The display characteristic instruction set 1042 is executable by the processing unit(s) 1002 to determine display characteristic instruction set 1042. In some implementations, display characteristic instruction set 1042 is executable within a graphics processing unit (GPU). In some implementations, display characteristic instruction set 1042 is executable within a fragment shader of a GPU. In some implementations, a GPU pipeline treats points of a point cloud as vertices provided by a vertex shader identified as pixels by a rasterizer and then provided with display characteristics by a fragment shader executing instructions. A fragment shader may additionally implement animations, blending, and/or animated transitions.

The display characteristic instruction set 1042 may be executed to, for example, obtain point cloud data, determine positions for the plurality of points in a coordinate system corresponding to an environment, determine a viewpoint within the coordinate system, determine display characteristics for the plurality of points based on spatial relationships between the positions determined for the plurality of points and the viewpoint in the coordinate system, and/or generate a view based on the viewpoint, the view comprising a point cloud comprising depictions of the plurality of points according to the determined display characteristics.

Although the instruction set(s) 1040 are shown as residing on a single device, it should be understood that in other implementations, any combination of the elements may be located in separate computing devices. Moreover, FIG. 10 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Numerous details are set forth herein to provide an understanding of the claimed subject matter. However, the claimed subject matter may be practiced without these specific details. Methods, apparatuses, or systems that would be known by one of ordinary skill have not been described in detail so as not to obscure claimed subject matter. Moreover, the systems discussed herein are not limited to any particular hardware architectures or configurations, or to performing operations only in the exemplary order of operations or organizational units described in the examples presented herein.

The use of "adapted to" or "configured to" is meant as open and inclusive language that does not foreclose performing additional tasks or steps. The use of "based on" is meant to be open and inclusive, in that a process, step, calculation, or other action "based on" one or more recited conditions or values may, in practice, be based on additional conditions or values beyond those recited. While the terms "first," "second," etc. may be used herein to describe various elements, these elements should not be limited by these terms. These terms are only used to distinguish one element from another. In addition, the singular forms "a," "an," and "the" are intended to include the plural forms as well, unless the context clearly indicates otherwise. The term "and/or" refers to and encompasses any and all possible combinations of one or more of the associated listed items. The terms "comprises" and/or "comprising," specify the presence of stated features, integers, steps, operations, elements, and/or components, but do not preclude the presence or addition of one or more other features, integers, steps, operations, elements, components, and/or groups thereof.

The foregoing description and summary of the invention are in every respect illustrative and exemplary, but not restrictive, and the scope of the invention disclosed herein is not to be determined only from the detailed description of illustrative implementations but according to the full breadth permitted by patent laws. The implementations shown and described herein are only illustrative of the principles of the present invention and various modification may be implemented by those skilled in the art without departing from the scope and spirit of the invention.

What is claimed is:

1. A method comprising:
at a processor of a first device:
obtaining point cloud data, the point cloud data specifying relative positions of a plurality of points representing a shape of one or more objects;
determining positions for the plurality of points in a coordinate system corresponding to an environment;
determining a viewpoint within the coordinate system;
determining display characteristics for the plurality of points based on spatial relationships between the positions determined for the plurality of points and the viewpoint in the coordinate system, wherein a first display characteristic provides a first shape for depictions of each point of a first set of the plurality of points based on each point of the first set being greater than a threshold distance from the viewpoint and a second display characteristic provides a second shape for depictions of each point of a second set of the plurality of points based on each point of the second set being less than the threshold distance from the viewpoint, wherein the first shape is different than the second shape; and
generating a view based on the viewpoint, the view comprising a point cloud comprising depictions of the plurality of points according to the determined display characteristics.

2. The method of claim 1, wherein the display characteristics are based on distance between respective points of the plurality of points and the viewpoint in the coordinate system.

3. The method of claim 1, wherein the display characteristics are based on a relative position of points of the point cloud and the viewpoint.

4. The method of claim 1, wherein the display characteristics are shapes for the depictions of the plurality of points.

5. The method of claim 1 further comprising:
obtaining, from the point cloud data, a logo associated with a source of the point cloud object, and wherein the depictions of each point of the second set of the plurality of points has a shape corresponding to a shape of the logo.

6. The method of claim 1, wherein the point cloud is a 3D model associated with a user interface capability, wherein the display characteristics identify the user interface capability.

7. The method of claim 1, wherein when executed using one or more processors of an electronic device, determining the viewpoint comprises determining a position and orientation of an electronic device within a physical environment.

8. The method of claim 1, wherein the first shape is a dot.

9. The method of claim 1, wherein the second display characteristic provides a more complex feature for depictions of each point of the second set relative to depictions of each point of the first set.

10. The method of claim 9, wherein the more complex feature is based on using a texture to render the depictions of each point of the second set.

11. The method of claim 9, wherein the more complex feature is based on using an image to render the depictions of each point of the second set.

12. The method of claim 9, wherein the more complex feature is based on using a logo to render the depictions of each point of the second set.

13. The method of claim 9, wherein the more complex feature is based on using an animation to render the depictions of each point of the second set.

14. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining point cloud data, the point cloud data specifying relative positions of a plurality of points representing a shape of one or more objects;
determining positions for the plurality of points in a coordinate system corresponding to an environment;
determining a viewpoint within the coordinate system;
determining display characteristics for the plurality of points based on spatial relationships between the positions determined for the plurality of points and the viewpoint in the coordinate system, wherein a first display characteristic provides a first shape for depictions of each point of a first set of the plurality of points based on each point of the first set being greater than a threshold distance from the viewpoint and a second display characteristic provides a second shape for depictions of each point of a second set of the plurality of points based on each point of the second set being less than the threshold distance from the viewpoint, wherein the first shape is different than the second shape; and
generating a view based on the viewpoint, the view comprising a point cloud comprising depictions of the plurality of points according to the determined display characteristics.

15. The system of claim 14, wherein the display characteristics are based on distance between respective points of the plurality of points and the viewpoint in the coordinate system.

16. The system of claim 14, wherein the display characteristics are based on a relative position of points of the point cloud and the viewpoint.

17. The system of claim 14, wherein the display characteristics are shapes for the depictions of the plurality of points.

18. The system of claim 14, wherein the operations further comprise:
obtaining, from the point cloud data, a logo associated with a source of the point cloud object, and wherein the depictions of each point of the second set of the plurality of points has a shape corresponding to a shape of the logo.

19. The system of claim 14, wherein the point cloud is a 3D model associated with a user interface capability, wherein the display characteristics identify the user interface capability.

20. A non-transitory computer-readable storage medium, storing program instructions executable by one or more processors to perform operations comprising:

obtaining point cloud data, the point cloud data specifying relative positions of a plurality of points representing a shape of one or more objects;

determining positions for the plurality of points in a coordinate system corresponding to an environment determining a viewpoint within the coordinate system;

determining display characteristics for the plurality of points based on spatial relationships between the positions determined for the plurality of points and the viewpoint in the coordinate system, wherein a first display characteristic provides a first shape for depictions of each point of a first set of the plurality of points based on each point of the first set being greater than a threshold distance from the viewpoint and a second display characteristic provides a second shape for depictions of each point of a second set of the plurality of points based on each point of the second set being less than the threshold distance from the viewpoint, wherein the first shape is different than the second shape; and generating a view based on the viewpoint, the view comprising a point cloud comprising depictions of the plurality of points according to the determined display characteristics.

* * * * *

UNITED STATES PATENT AND TRADEMARK OFFICE
CERTIFICATE OF CORRECTION

PATENT NO. : 12,051,147 B1
APPLICATION NO. : 17/736339
DATED : July 30, 2024
INVENTOR(S) : Tyson Erze Page 1 of 1

It is certified that error appears in the above-identified patent and that said Letters Patent is hereby corrected as shown below:

In the Claims

Claim 20, Column 15, Line 5, reads:
"... coordinate system corresponding to an environment ..."

Should read:
--...coordinate system corresponding to an environment; ...--

Signed and Sealed this
Twenty-seventh Day of August, 2024

Katherine Kelly Vidal
*Director of the United States Patent and Trademark Office*